(12) United States Patent
Fauteux et al.

(10) Patent No.: US 10,381,605 B2
(45) Date of Patent: Aug. 13, 2019

(54) BATTERY POUCH, BATTERY CELL AND METHOD OF MAKING A POUCH OR BATTERY CELL

(71) Applicant: TECHTRONIC INDUSTRIES COMPANY LIMITED, Tsuen Wan (HK)

(72) Inventors: Denis Gaston Fauteux, Tsuen Wan (HK); Wing Keung Woo, Tsuen Wan (HK)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 146 days.

(21) Appl. No.: 15/502,602

(22) PCT Filed: Aug. 10, 2015

(86) PCT No.: PCT/CN2015/086488
§ 371 (c)(1),
(2) Date: Feb. 8, 2017

(87) PCT Pub. No.: WO2016/019924
PCT Pub. Date: Feb. 11, 2016

(65) Prior Publication Data
US 2017/0229682 A1 Aug. 10, 2017

(30) Foreign Application Priority Data
Aug. 8, 2014 (HK) .................... 14108177

(51) Int. Cl.
*H01M 2/02* (2006.01)
*H01M 2/06* (2006.01)
(Continued)

(52) U.S. Cl.
CPC .......... *H01M 2/021* (2013.01); *H01M 2/0212* (2013.01); *H01M 2/0275* (2013.01);
(Continued)

(58) Field of Classification Search
CPC .... H01M 2/0287; H01M 2/30; H01M 2/0212; H01M 2/021; H01M 2/0275
See application file for complete search history.

(56) References Cited

U.S. PATENT DOCUMENTS 6,312,851 B1 * 11/2001 Fukuda ............... H01M 2/0242
429/120
2001/0038938 A1 11/2001 Takahashi
(Continued)

FOREIGN PATENT DOCUMENTS

| CN | 201069792 Y | 6/2008 |
| JP | 2000067846 | 3/2000 |

OTHER PUBLICATIONS

International Preliminary Report on Patentability for Application No. PCT/CN2015/086488 dated Feb. 14, 2017 (6 pages).
International Search Report and Written Opinion for Application No. PCT/CN2015/086488 dated Oct. 27, 2015 (8 pages).
(Continued)

*Primary Examiner* — Olatunji A Godo
(74) *Attorney, Agent, or Firm* — Michael Best & Friedrich LLP

(57) ABSTRACT

A pouch-type battery comprising: a pouch-type battery case having a joined wall and a cell space within the pouch, a battery cell within the cell space, a terminal tab extending outwardly of the cell space from the battery cell, said joined wall comprising at least a first sealing portion having a first sealing strength, and a second sealing portion having a second sealing strength that is less than the first sealing strength such that the second sealing portion is adapted to fail before said first sealing portion, and an electrical contact located with the second sealing portion and adapted to change contact state upon failure of the second sealing portion.

20 Claims, 2 Drawing Sheets

(51) Int. Cl.
*H01M 2/12* (2006.01)
*H01M 2/34* (2006.01)
*H01M 10/0525* (2010.01)
*H01M 10/058* (2010.01)
*H01M 10/42* (2006.01)
*H01M 2/30* (2006.01)

(52) U.S. Cl.
CPC ........... *H01M 2/0287* (2013.01); *H01M 2/06* (2013.01); *H01M 2/1235* (2013.01); *H01M 2/30* (2013.01); *H01M 2/34* (2013.01); *H01M 10/058* (2013.01); *H01M 10/0525* (2013.01); *H01M 10/425* (2013.01); *H01M 2200/00* (2013.01); *H01M 2220/30* (2013.01)

(56) References Cited

U.S. PATENT DOCUMENTS

| 2009/0246607 | A1 | 10/2009 | Shinyashiki et al. |
| 2010/0291423 | A1 | 11/2010 | Hideo |
| 2011/0097630 | A1* | 4/2011 | Choi .................. H01M 2/0257 429/246 |
| 2011/0104520 | A1 | 5/2011 | Ahn |
| 2013/0143077 | A1 | 6/2013 | Yebka |

OTHER PUBLICATIONS

European Patent office Search Report for Application No. 15830550.8 dated Dec. 5, 2017, 9 pages.
Australian Patent Office Examination Report No. 1 for Application No. 2015299442 dated Dec. 20, 2017, 3 pages.

\* cited by examiner

BATTERY POUCH, BATTERY CELL AND METHOD OF MAKING A POUCH OR BATTERY CELL

FIELD OF THE INVENTION

The present invention relates to pouch-type lithium ion or lithium-polymer battery cells, and to pouch type lithium ion or lithium-polymer battery packs for use in portable power tools, including tools, garden tools and home appliances. The invention also relates to a method of making a pouch-type battery cell to include a current interrupting mechanism. In particular, the invention relates to a pouch-type lithium ion or lithium-polymer cell and battery pack suitable for powering a hand held cordless power tool.

BACKGROUND TO THE INVENTION

Pouch-type lithium ion and lithium-polymer battery cells offer efficient way to design and produce high capacity and low resistance power capable to deliver high power with minimum heat generation However, the absence of a hard case containment make its difficult to control, swelling, bulging and venting of the pouch due to gas generation during charge and discharge, a concern with pouch-type cells. This invention provides a mean add a CID to pouch-type lithium ion power cell.

SUMMARY OF THE INVENTION

The present invention provides a pouch-type lithium ion or lithium-polymer battery cell and battery pack a method/means for a battery, tool or charger to determine when a pouch-type lithium ion battery cell/pack internal pressure has increase and anticipate venting and provide a mean to disconnect the cell from external load/supply as to interrupt charge/discharge of the cell/pack.

The pouch walls are sealed so that one portion of the seal is weaker than other portions and will fail first. An electrical contact is provided with the weaker seal portion. Preferably, although not exclusively, the electrical contact has an electrical resistance of less than, say, 10-ohms. if the pouch internal pressure increases, prior to venting the resistance of the electrical contact is interrupted or at least increased. It the resistance between the contact and terminal increases to over, say, 20-ohms then electronic control in the pack and/or the charger and/or the tool determines that there is a possible pressure increase and will interrupt the charge/discharge prior to venting of the cell pouch. The electrical contact may include one of the cell terminals.

On one particular aspect of the invention there is provided a pouch-type battery comprises a pouch-type battery case having a joined wall and a cell space within the pouch, a battery cell within the cell space, a terminal tab extending outwardly of the cell space from the battery cell, said joined wall comprising at least a first sealing portion having a first sealing strength, and a second sealing portion having a second sealing strength that is less than the first sealing strength such that the second sealing portion is adapted to fail before said first sealing portion, and an electrical contact located with the second sealing portion and adapted to change contact state upon failure of the second sealing portion.

Preferably, although not exclusively, the second sealing portion seals the pouch-type battery case and the terminal tab, the terminal tab forming at least one part of the electrical contact.

Preferably, the electrical contact comprises a contact tab in electrical contact with the terminal tab, the contact tab adapted to separate from the terminal tab upon failure of the second sealing portion.

Preferably, the terminal tab comprises one of an anode lead or a cathode lead, and wherein a. second terminal tab comprises a second one of the anode lead or the cathode lead, and wherein the terminal tab and second terminal tab extend oppositely outwardly of the pouch-type battery case.

Preferably, the battery cell has lithium-polymer based chemistry.

Preferably, the pouch-type battery comprises a plurality of pouch-type battery cases, each accommodating a battery cell interconnected to form a power tool battery.

In a second particular aspect of the invention there provided a lithium-polymer battery powered tool comprising the pouch-type battery.

In a third particular aspect of the invention there is provided a method of manufacturing a power tool battery, the method comprising providing a pouch having a first and second sheets, sealing the first and second sheets along at least two walls to define a cell space between said sheets, disposing a battery cell within the cell space, the battery cell having a terminal tab extending outwardly of the cell space, wherein sealing the first and second sheets along at least two walls comprises, sealing at least a first wall portion with a first sealing strength, and sealing at least a second wall portion with a second sealing strength that is less than the first sealing strength such that the second sealing portion is adapted to fail before the first sealing portion, and providing an electrical contact located with the second sealing portion and adapted to change contact state upon failure of the second sealing portion.

Preferably, the second sealing portion seals the pouch-type battery case and the terminal tab, the terminal tab forming at least one part of the electrical contact.

Preferably, the electrical contact comprises a contact tab in electrical contact with the terminal tab and adapted to separate from the terminal tab upon failure of the second sealing portion.

Preferably, the battery has a nominal charged internal impedance of less than or equal to approximately 10 milliohms.

Preferably, the battery has a nominal charged internal impedance of less than or equal to approximately 5 milliohms.

Preferably, the battery has a capacity of greater than or equal to 2 Ah.

Preferably, the battery has an output voltage of at least 4 volts and a combined average discharge current of greater than 10 amps.

Further aspects of the invention will become apparent from the following description which is given by way of example only to illustrate the invention.

DESCRIPTION OF THE DRAWINGS

Various embodiments of the invention will now be described, by way of example only, with reference to the accompanying drawings in which.

DETAILED DESCRIPTION OF PREFERRED EMBODIMENTS OF THE INVENTION

The following description is given by way of example only to illustrate embodiments of the invention. The terminology used is for illustrative purpose only and is not intended to limit the scope or use of the invention, unless the text clearly and explicitly requires otherwise. A skilled person will appreciate that the invention is applicable to pouch-type battery cells generally. Where in the description reference is made to lithium ion or to lithium-polymer battery cells such reference shall be interpreted as referring to both lithium ion and lithium-polymer battery cells, or to pouch-type cells generally unless the context clearly requires otherwise.

The inventors have filed a PCT application number PCT/CN2014/080868 on 26 Jun. 2014 relating to two or more pouch-type battery cells strung together to form a battery pack, a tool battery and a battery operated tool. The entire contents of PCT/CN2014/080868 filed 26 Jun. 2014 are incorporated herein by reference.

Figure 1:
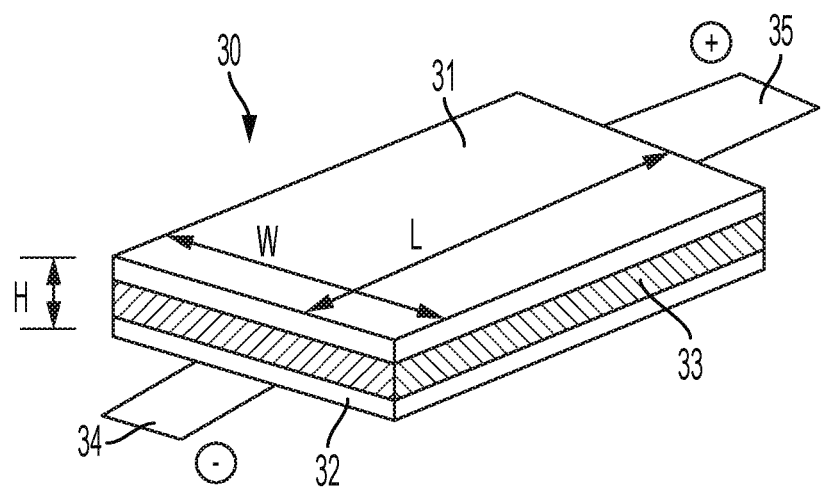
FIG. 1 illustrates a lithium-polymer based battery cell according to the invention.
Figure 2:
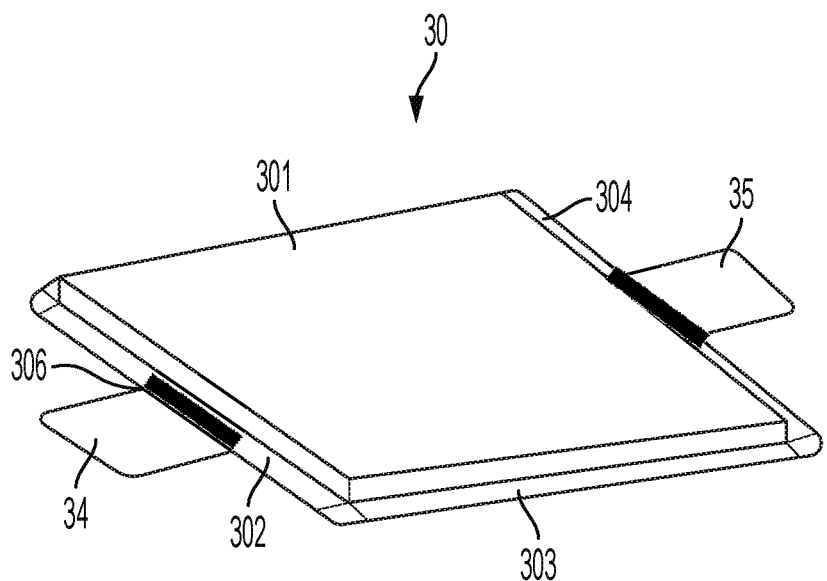
FIG. 2 illustrates a cell pouch for a lithium-polymer based battery.
Figure 3:
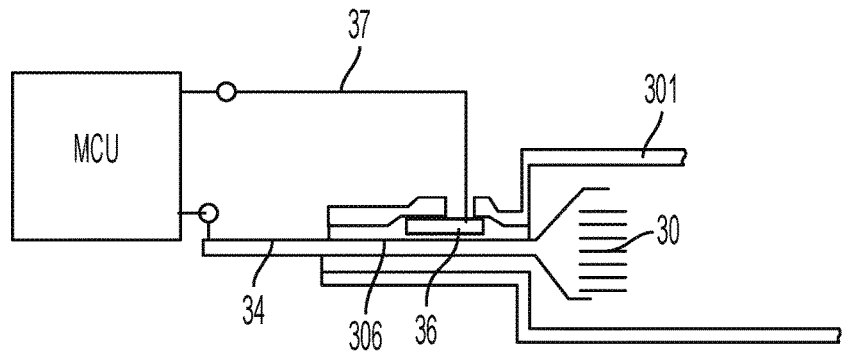
FIG. 3 illustrates a cross section though a second sealing portion of a pouch wall.
Figure 4:
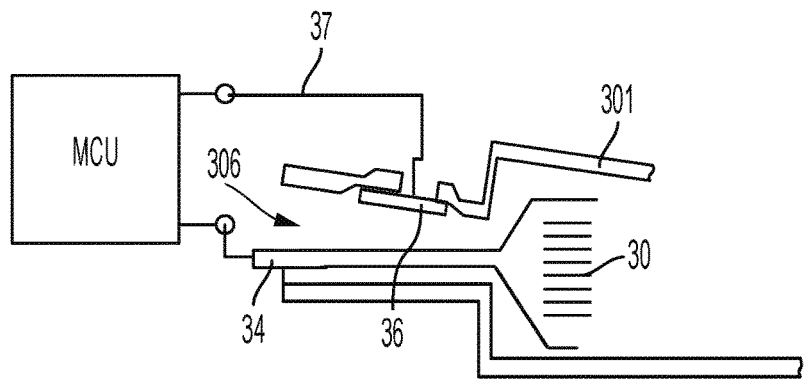
FIG. 4 illustrates a cross section though the second sealing portion of a pouch wall, in which the wall seal has failed due to venting.

FIGS. 1 and 2 illustrate a typical pouch type battery for location within a tool battery pack housing. A lithium-polymer cell 30 comprises a first electrode 31 and a second electrode 32 laminated to respective sides of a polymer based separator substrate 33. Connection tabs/tapes 34 and 35 are connected to the respective first and second electrodes 31, 32. The first and second electrodes 31, 32 may be any of the lithium-polymer cell anode and cathode combinations known in the art. The polymer separator 33 may be a dry solid polymer electrolyte or porous or micro-porous polymer substrate holding a lithium based electrolyte. The cell is enclosed in a flexible and lightweight pouch 301. The pouch 301 is formed from, for example, an Aluminum laminate film that is folded around the cell 30 to form upper and lower sheets defining a cell space and sealed along the three adjoining sides 302, 303, 304. The connection tabs/tapes 34 and 35 protrude from the pouch between the opposite sealed edges 302, 305 of the pouch.

Figure 5:
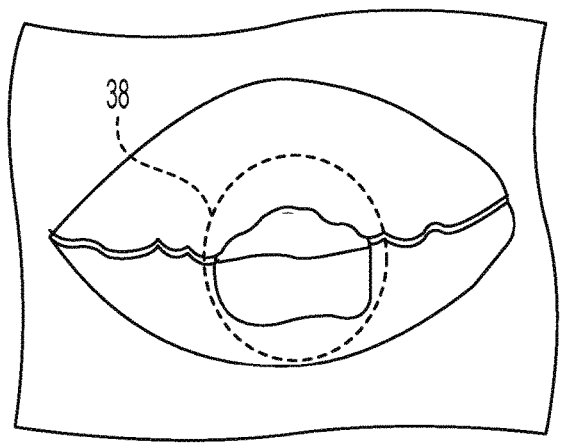
FIG. 5 illustrates venting failure of the pouch wall.

The battery cell is used in a battery that is associated with a battery, tool or charger machine control unit (MCU), or other battery monitoring or protection electronics. To enable the MCU to determine when the pouch-type battery cell has vented due to gas generation during charge and discharge the wall 303, 304 and 305 have a first sealing portion having a first sealing strength, and a second sealing portion 306 that has a second sealing strength that is less than the first sealing strength such that the second sealing portion is adapted to fail before said first sealing portion. FIG. 5 illustrates venting failure 38 of the pouch wall at the position of the second sealing portion 306.

In a preferred embodiment the second sealing portion 306 seals one of the terminal tabs 34 where it passes through the pouch wall 302. An electrical contact tab 36 is located at the edge of one of the sheet walls at the position of the second sealing portion 306 such that when the pouch sheets are sealed with the terminal tab 34 at the second sealing position the contact tab 36 is in electrical contact with the terminal tab 34. A lead wire 37 is provided with the contact tab 36 such that it can be connected with an MCU, or other electrical circuit, to determine the resistance of the circuit though the contact tab 36 and terminal tab 34. If the pouch 301 vents at the second sealing position the contact state changes and is sensed by the MCU or electrical circuit. It may be the case that a small venting does not completely rupture the wall sealing at the second position 306. Accordingly, a scheme is implemented where in the normal state the contact has a resistance below a threshold, say 10-ohm, and where the resistance rises above the threshold, or a second higher threshold of say 20-ohms, the MCU or electrical circuit interprets the rise as a venting of the pouch 301. Upon venting of the pouch the MCU or electrical protection circuit can take a preventative action such as, for example, shutting down of the battery, or tool or charger as may be in use with the battery at the time. Although in the preferred embodiment the contact includes the terminal tab 34, in some embodiments there may be a separate contact set in the second sealing portion not involving the terminal tab 34.

Typical sealing strengths for a pouch-type cell might be in a range of 8 kgf (kilogram-force) to 12 kgf In case one a side wall, say 303, is provided with a sealing strength of greater than 12 kgf as opposed to a nominal 9 kgf in the anode or cathode walls 302, 305. Accordingly the pouch can be made to fail in the anode or cathode walls 302, 305 as required. The sealing strength is controlled via the adhesive strength and thickness of the sealing.

In a further embodiment of the invention the sealing strength along any one of the sides 302, 303, 304 may vary. For example, in such an embodiment side 303 is provided with a first and highest sealing strength. The sealed ends 302, 304 are provided with a third sealing portion having a third sealing strength that is less than the first sealing strength. The second sealing portion 306 has a second sealing strength that is less than the first and third sealing strengths such that the second sealing portion is adapted to fail before said first and third sealing portions. A skilled person will appreciate also that the lowest sealing strength may be located at any position on the sealed sides 302, 303, 304 such that the pouch will fail at that lowest sealing strength location first so that, in combination with some indicator means, a cell rupture signal can be provided to the cell or a tool control means.

A pouch-type battery cell or a power tool battery of the present invention may also incorporate any of the features set forth in PCT/CN2014/080868 filed 26 Jun. 2014 and incorporated herein, including but not limited to a nominal charged internal impedance of less than or equal to approximately 10 milliohms, or more preferably 5 milliohms, and/or a capacity of greater than or equal 2 Ah, and/or an output voltage of at least 4 volts and a combined average discharge current of greater than 10 amps.

The invention claimed is:

1. A pouch-type battery comprising:
   a pouch-type battery case having a joined wall and a cell space within the pouch-type battery case;
   a battery cell within the cell space;
   a terminal tab extending outwardly of the cell space from the battery cell,
   said joined wall comprising at least a first sealing portion having a first sealing strength, and a second sealing portion having a second sealing strength that is less than the first sealing strength such that the second sealing portion is configured to fail before said first sealing portion; and
   an electrical contact located with the second sealing portion and configured to change contact state upon failure of the second sealing portion.

2. The pouch-type battery of claim 1, wherein the second sealing portion seals the pouch-type battery case and the terminal tab, the terminal tab forming at least one part of the electrical contact.

3. The pouch-type battery of claim 2, wherein the electrical contact comprises a contact tab in electrical contact with the terminal tab, the contact tab configured to separate from the terminal tab upon failure of the second sealing portion.

4. The pouch-type battery of claim 1, wherein the terminal tab includes one of an anode lead or a cathode lead, and wherein the pouch-type battery further comprises a second terminal tab including a second one of the anode lead or the cathode lead, and wherein the terminal tab and second terminal tab extend oppositely outwardly of the pouch-type battery case.

5. The pouch-type battery of claim 1, wherein the battery cell has a lithium ion based chemistry or a lithium-polymer based chemistry.

6. The pouch-type battery of claim 1, further comprising a plurality of pouch-type battery cases, each accommodating an associated battery cell interconnected to form a power tool battery.

7. A method of manufacturing a power tool battery, the method comprising:
    providing a pouch having a first sheet and a second sheet;
    sealing the first sheet and the second sheet along at least two walls to define a cell space between said sheets, wherein sealing the first sheet and the second sheet includes sealing at least a first wall portion with a first sealing strength, and sealing at least a second wall portion with a second sealing strength that is less than the first sealing strength such that the second wall portion is configured to fail before the first wall portion;
    disposing a battery cell within the cell space, the battery cell having a terminal tab extending outwardly of the cell space; and
    providing an electrical contact located with the second sealing portion and configured to change contact state upon failure of the second sealing portion.

8. The method of claim 7, wherein sealing at least a second wall portion includes sealing the pouch and the terminal tab, the terminal tab forming at least one part of the electrical contact.

9. The method of claim 7, wherein providing an electrical contact includes providing an electrical contact including a contact tab in electrical contact with the terminal tab and configured to separate from the terminal tab upon failure of the second sealing portion.

10. The pouch-type battery of claim 1, wherein the pouch-type battery has a nominal charged internal impedance of less than or equal to approximately 10 milliohms.

11. The pouch-type battery of claim 1, wherein the pouch-type battery has a nominal charged internal impedance of less than or equal to approximately 5 milliohms.

12. The pouch-type battery of claim 10, wherein the pouch-type battery has a capacity of greater than or equal to 2 ampere-hours.

13. The pouch-type battery of claim 10, wherein the pouch-type battery has an output voltage of at least 4 volts and a combined average discharge current of greater than 10 amps.

14. The pouch-type battery of claim 11, wherein the pouch-type battery has a capacity of greater than or equal to 2 ampere-hours.

15. The pouch-type battery of claim 11, wherein the pouch-type battery has an output voltage of at least 4 volts and a combined average discharge current of greater than 10 amps.

16. An electrical combination comprising:
    a power tool; and
    a pouch-type battery including
        a pouch-type battery case having a joined wall and a cell space within the pouch-type battery case,
        a battery cell within the cell space,
        a terminal tab extending outwardly of the cell space from the battery cell,
        said joined wall comprising at least a first sealing portion having a first sealing strength, and a second sealing portion having a second sealing strength that is less than the first sealing strength such that the second sealing portion is configured to fail before said first sealing portion, and
        an electrical contact located with the second sealing portion and configured to change contact state upon failure of the second sealing portion.

17. The electrical combination of claim 16, wherein the battery cell has a lithium ion based chemistry or a lithium-polymer based chemistry.

18. The electrical combination of claim 16, wherein the pouch-type battery includes a plurality of pouch-type battery cases, each accommodating an associated battery cell interconnected to form a power tool battery.

19. The electrical combination of claim 16 wherein the electrical contact includes a contact tab in electrical contact with the terminal tab, the contact tab configured to separate from the terminal tab upon failure of the second sealing portion.

20. The electrical combination of claim 16, wherein the terminal tab includes one of an anode lead or a cathode lead, and wherein the pouch-type battery further includes a second terminal tab including a second one of the anode lead or the cathode lead, and wherein the terminal tab and second terminal tab extend oppositely outwardly of the pouch-type battery case.

* * * * *